(12) United States Patent
Xiao (10) Patent No.: US 8,063,671 B2
(45) Date of Patent: Nov. 22, 2011

(54) DRIVING CIRCUIT OF SWITCH DEVICE

(75) Inventor: Xueli Xiao, Shenzhen (CN)

(73) Assignee: Liebert Corporation, Columbus, OH (US)

( * ) Notice: Subject to any disclaimer, the term of this patent is extended or adjusted under 35 U.S.C. 154(b) by 0 days.

(21) Appl. No.: 12/663,719

(22) PCT Filed: Jun. 13, 2008

(86) PCT No.: PCT/CN2008/001148
§ 371 (c)(1),
(2), (4) Date: May 12, 2010

(87) PCT Pub. No.: WO2008/154811
PCT Pub. Date: Dec. 24, 2008

(65) Prior Publication Data
US 2010/0213988 A1      Aug. 26, 2010

(30) Foreign Application Priority Data

Jun. 15, 2007 (CN) .......................... 2007 1 0127021

(51) Int. Cl.
*H03B 1/00* (2006.01)
(52) U.S. Cl. ........ 327/109; 327/391; 327/429; 327/437; 323/282; 323/290
(58) Field of Classification Search .......... 327/108–112, 327/389, 391, 393–394, 427, 429, 434, 437; 323/271, 272, 282, 290; 363/40–41, 21.15
See application file for complete search history.

(56) References Cited

U.S. PATENT DOCUMENTS 4,694,206 A * 9/1987 Weinberg ...................... 327/404

(Continued)

FOREIGN PATENT DOCUMENTS

| JP | 7-015949 A | 1/1995 |
|---|---|---|
| JP | 200500617 A | 1/2005 |

OTHER PUBLICATIONS

International Search Report for PCT/CN2008/001148. ISA/CN, mailed Sep. 25, 2008.

*Primary Examiner* — An Luu
(74) *Attorney, Agent, or Firm* — Harness, Dickey & Pierce, P.L.C.

(57) ABSTRACT

The present invention relates to a driving circuit of switch device. The present invention employs transformer isolated driving. The number of said transformers is two. The primary sides of the two transformers are connected to two driving modulators, respectively. The input terminal of a high frequency carrier signal and the input terminal of a driving signal are connected to the input terminal of a first driving modulator. The input terminal of a driving signal being connected with an inverter together with the input terminal of the high frequency carrier signal are connected to the input terminal of a second driving modulator. The first secondary side of the first transformer is connected to a power supply circuit which may provide a necessary voltage for turning on the switch device during a high level period of the driving signal. The first secondary side of a second transformer is connected to a voltage discharging circuit which may discharge a turn-on voltage of the switch device into a low level during a low level period of the driving signal. Therefore, the pair transistor amplification circuit in the existing transformer isolated driving becomes unnecessary, which provides a high driving power. In addition, employing no optical coupler isolated element makes the working life even longer.

8 Claims, 11 Drawing Sheets

U.S. PATENT DOCUMENTS

| | | | |
|---|---|---|---|
| 5,301,085 A | * 4/1994 | Miettinen | 361/93.6 |
| 5,686,854 A | 11/1997 | Smith | |
| 6,836,161 B2 | 12/2004 | Akiyama et al. | |
| 6,970,023 B2 | * 11/2005 | Fedigan | 327/109 |

* cited by examiner

DRIVING CIRCUIT OF SWITCH DEVICE

FIELD OF THE INVENTION

The present invention relates to a driving circuit of switch device, which is mainly applied in the field of power conversion.

BACKGROUND OF THE INVENTION

Figure 1:
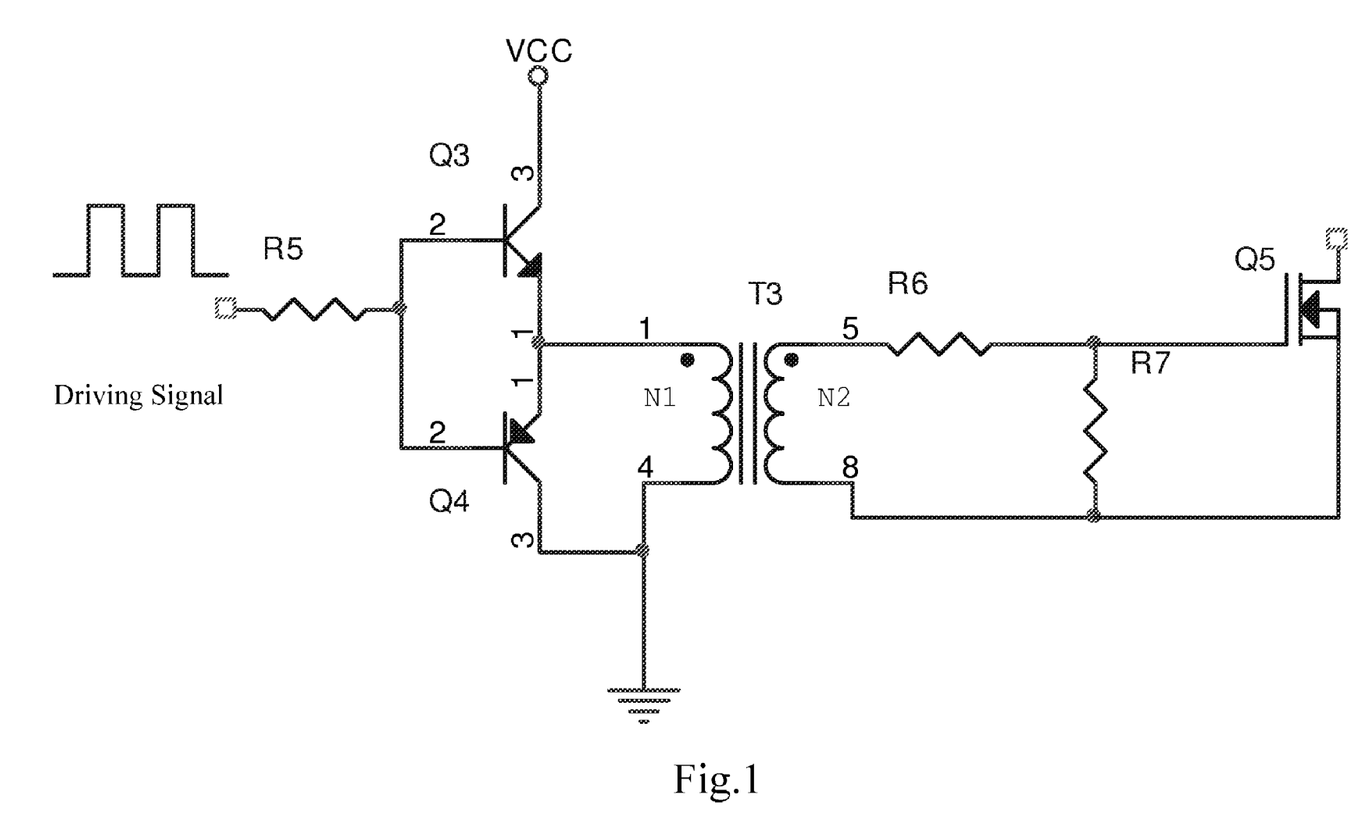
FIG. 1 is a circuit diagram of the existing transformer isolated driving circuit of the switch device.
Figure 2:
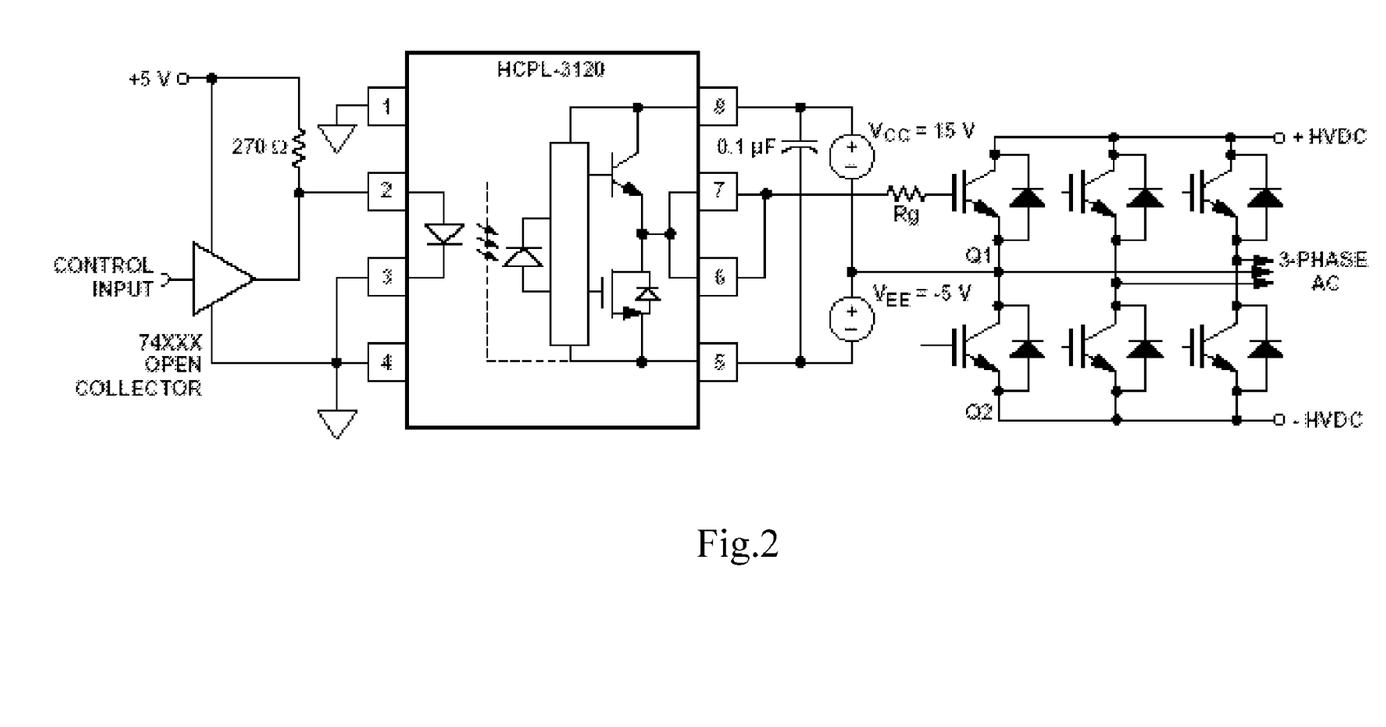
FIG. 2 is a circuit diagram of the existing optical coupler isolated driving circuit of the switch device.

At present, in the field of power conversion, switch devices need fast and reliable driving circuits. The common methods of isolating the driving circuits mainly include transformer isolated driving and optical coupler isolated driving. The transformer isolated driving circuits is shown in FIG. 1, where a driving signal directly drives the transformer after being amplified by a pair transistor and the secondary side of the transformer drives the MOS (Field Effect Transistor) via a resistor. This circuit is characterized in that the MOSFET needs no separate power supply and the transformer provides both signals and power supply. This circuit has a simple structure, low cost and a long working life but requires a quite high instantaneous pulse current at the moment of driving the pulse and needs a relatively large pair transistor to generate driving current and requires that the transformer has a low resistance so that the transformer is large in size. Therefore, it is applicable to a low power driving device. Optical coupler isolated driving is shown in FIG. 2 where the IGBT (insulation gate bipolar transistor) is powered by an independent power converter which generates positive/negative power supply. Signals are transferred via the optical coupler HCPL 3120 and signals and power supply of the driving circuit are transferred separately. This circuit is characterized in that which has a relatively high driving power but a complicated circuit and a delay in transferring signals is caused by the optical coupler, and the circuit is appropriate for transferring signals of 20 kHz or below but requires a special high frequency optical coupler, which is rather expensive, for transferring signals of even higher frequency. In addition, the optical coupler is disadvantageous in that the luminous intensity of the LEDs in the optical coupler degrades gradually as time elapses and failing to properly transfer the signals over a certain period, thus having a working life of 50 to 100 thousands hours in general. Meanwhile MOS and IGBT, which are voltage driving device, have a relatively high input capacity between the gate and the source, so that when the MOS and IGBT need to be turned on, a driving high level voltage must be set up on the input capacitor, whereas when the MOS and IGBT need to be turned off, voltage on the input capacitor needs to be discharged immediately or even a reverse voltage is set up. Accordingly the energy of the input capacitor is dissipated due to the resistor of the driving circuit during the charging and discharging process.

SUMMARY OF THE INVENTION

The present invention aims at solving the technical problem of providing a driving circuit of switch devices with a long working life and a high driving power.

The driving circuit of switch devices according to the present invention includes a transformer, an input terminal of a driving signal, a switch device, with the input terminal of the driving signal connecting to a primary side of the transformer and the switch device connecting to a secondary side of the transformer, wherein: the number of said transformers is two; the primary sides of the two transformers are connected to two driving modulators, respectively; one terminal of the primary side of a first transformer T1 is grounded while the other terminal is connected to an output terminal of a first driving modulator U1A; an input terminal of a high frequency carrier signal and the input terminal of the driving signal are connected to an input terminal of the first driving modulator U1A; one terminal of the primary side of a second transformer T2 is grounded while the other terminal is connected to an output terminal of a second driving modulator U2A; the input terminal of the driving signal is connected to an input terminal of an inverter U3A; an output terminal of the inverter U3A and the input terminal of the high frequency carrier signal are connected to an input terminal of the second driving modulator U2A; an secondary side of the first transformer T1 is connected to a power supply circuit which may provide necessary voltage for turning on the switch device during a high level period of the driving signal; and an secondary side of the second transformer T2 is connected to a voltage discharging circuit which may discharge the turn-on voltage of the switch device into a low level during a low level period of the driving signal.

The number of the secondary side of said first transformer T1 is two; said power supply circuit comprises an electrolytic capacitor C1 and a power charging driving switch transistor Q1 having its gate and source connected respectively to two output terminals of the second secondary side of the first transformer T1; the first secondary side of the first transformer T1, after being rectified, is connected in parallel with the electrolytic capacitor C1; a negative terminal of the electrolytic capacitor C1 is connected to a source of a switch device QS; a positive terminal of the electrolytic capacitor C1 is connected to a drain of the power charging driving switch transistor Q1; a gate of the switch device QS is connected to a source of the power charging driving switch transistor Q1. Such an design enables the electrolytic capacitor C1 to provide a necessary voltage for turning on the gate of the switch device by means of the on and off of the power charging driving switch transistor during a high level period of the driving signal.

The number of the primary side of said second transformer T2 is one; said voltage discharging circuit comprises an energy dissipating element and a discharge voltage driving switch transistor Q2 having its gate and source connected respectively to two output terminals of the secondary side of the second transformer; a gate of a switch device QS being connected in series with the energy dissipating element is connected to a drain of the discharge voltage driving switch transistor Q2, and a source of the switch device QS is connected to a source of the discharge voltage driving switch transistor. Such a design may discharge the turn-on voltage of the switch device into a low level by means of turning on the discharge voltage driving switch device during a low level period of the driving signal. This circuit is relatively simple and is appropriate for applying MOSFET to low power applications.

The number of the primary side of said second transformer T2 is two; said voltage discharging circuit comprises an energy dissipating device and a discharge voltage driving switch transistor Q2 having its gate and source connected respectively to two output terminals of the second secondary side of the second transformer; the gate of the switch device QS being connected in series with the energy dissipating device is connected to a drain of the discharge voltage driving switch transistor Q2; a source of the discharge voltage driving switch transistor Q2 is connected to the output terminals of the first secondary sides being rectified of the first transformer T1 and the second transformer T2 which output a low voltage; the first secondary side of the second transformer T2, after being rectified, is connected in parallel with said electrolytic capacitor C1. Accordingly, the electrolytic capacitor C1 serving as the auxiliary power supply of the switch device may be charged during driving both a high level period and a low level period, so that the voltage of the electrolytic capacitor serving as the auxiliary power supply of the switch device is kept stable, thereby ensuring that the main switch transistor MOS or IGBT may acquire driving pulses with a stable amplitude.

Said energy dissipating element is an inductor L1; the gate of the switch device QS and the source of the power charging driving switch transistor Q1 are connected in series via said inductor L1; the gate of the switch device QS and the drain of the power charging driving switch transistor Q1 are connected in series via a diode D9 in forward direction; the gate of the switch device QS and the output terminals of the first secondary sides being rectified of the first transformer T1 and the second transformer T2 which output a low voltage are connected in series via a diode D10 in reverse direction. Accordingly, the inductor L1 and the electrolytic capacitor C1 together with the equivalent capacitor C2 between the gate and source of the switch device form an LC lossless circuit, which enables the energy of the equivalent capacitor C2 and the inductor L to be fed back to the electrolytic capacitor C1 via the inductor L instead of being dissipated.

The source of said discharge voltage driving switch transistor Q2 and the negative terminal of the electrolytic capacitor C1 are connected to the same output terminal of the first secondary sides being rectified of the first transformer T1 and the second transformer T2 which output a low voltage. Such a design enables the source of the discharge voltage driving switch transistor Q2 and the negative terminal of the electrolytic capacitor C1 are both grounded with no voltage difference in between.

The positive terminal of the diode D10, the source of the discharge voltage driving switch transistor Q2 and the negative terminal of the electrolytic capacitor C1 are connected to the same output terminal of the first secondary side being rectified of the first transformer T1 and the second transformer T2 which output a low voltage. Such a design enables the positive terminal of the diode D10, the source of the discharge voltage driving switch transistor Q2 and the negative terminal of the electrolytic capacitor C1 are all grounded with no voltage difference in between.

Said switch device is an IGBT, and a rectifier diode D1, a rectifier diode D2, an electrolytic capacitor C4, an electrolytic capacitor C5 constitute a half bridge rectifier circuit of the output terminal of the first secondary side of the first transformer; one terminal of the output terminal of the first secondary side of the first transformer T1 is connected respectively to the positive terminal of the rectifier diode D1 and the negative terminal of the rectifier diode D2; the negative terminal of the rectifier diode D1 and the positive terminal of the rectifier diode D2 are connected in series with the electrolytic capacitor C4 and the electrolytic capacitor C5 in forward direction; the other terminal of the output terminal of the first secondary side of the first transformer is connected between the electrolytic capacitor C4 and the electrolytic capacitor C5; whereas a rectifier diode D5, a rectifier diode D6, an electrolytic capacitor C6, an electrolytic capacitor C7 constitute a half bridge rectifier circuit of the output terminal of the first secondary side of the second transformer; one terminal of the output terminal of the first secondary side of the second transformer is connected respectively to the positive terminal of the rectifier diode D5 and the negative terminal of the rectifier diode D6; the negative terminal of the rectifier diode D5 and the negative terminal of the rectifier diode D6 are connected in series with the electrolytic capacitor C6 and the electrolytic capacitor C7 in forward direction; the other terminal of the output terminal of the first secondary side of the second transformer is connected between the electrolytic capacitor C6 and the electrolytic capacitor C7; the negative terminal of the electrolytic capacitor C1 is connected between the electrolytic capacitor C4 and the electrolytic capacitor C5 and between the electrolytic capacitor C6 and the electrolytic capacitor C7; a Zener diode D16 is connected in series in the forward direction between the negative terminal of the electrolytic capacitor C5 and C7 and the diode D10; an electrolytic capacitor C3 and a resistor R4 are connected in parallel; the positive terminal of the electrolytic capacitor C3 is connected to the negative terminal of the electrolytic capacitor C1; the negative terminal of the electrolytic capacitor C3 is connected to the negative terminal of the Zener diode D16. Accordingly, the positive terminal of the diode D10 and the source terminal of the discharge voltage driving switch transistor Q2 have the same voltage and they form a negative bias voltage with the negative terminal of the electrolytic capacitor C1 to resist interference.

Said switch device is an MOS, and a capacitor C8 is connected in series between the output terminal of the first driving modulator U1A and the primary side of the first transformer T1, whereas a capacitor C9 is connected in series between the output terminal of the second driving modulator U2A and the primary side of the second transformer T2. The capacitors C8 and C9 connected in series are blocking capacitors in order to prevent the driving transformer from becoming saturated due to a DC bias.

The present invention employs two transformers isolation and integrates signals and a power supply using a high frequency carrier, wherein the two transformers respectively transfer high level and low level to achieve driving of the switch device, the secondary side of the transformer is connected to the power supply circuit which provides a necessary voltage for turning on the switch device, the power supply circuit may provide an instantaneous high current s and eliminates the dependence on the transformers. Therefore, the pair transistor amplification circuit and the large driving pair transistor in the existing transformer isolated driving become unnecessary, which reduces the size of the transformers and is applicable to driving devices of a high power accordingly. In addition, employing no optical coupler isolated element makes the working life even longer.

DETAILED DESCRIPTION OF THE EMBODIMENTS

The present invention will be further described below in combination with the drawings and its preferred embodiments.

Figure 3:
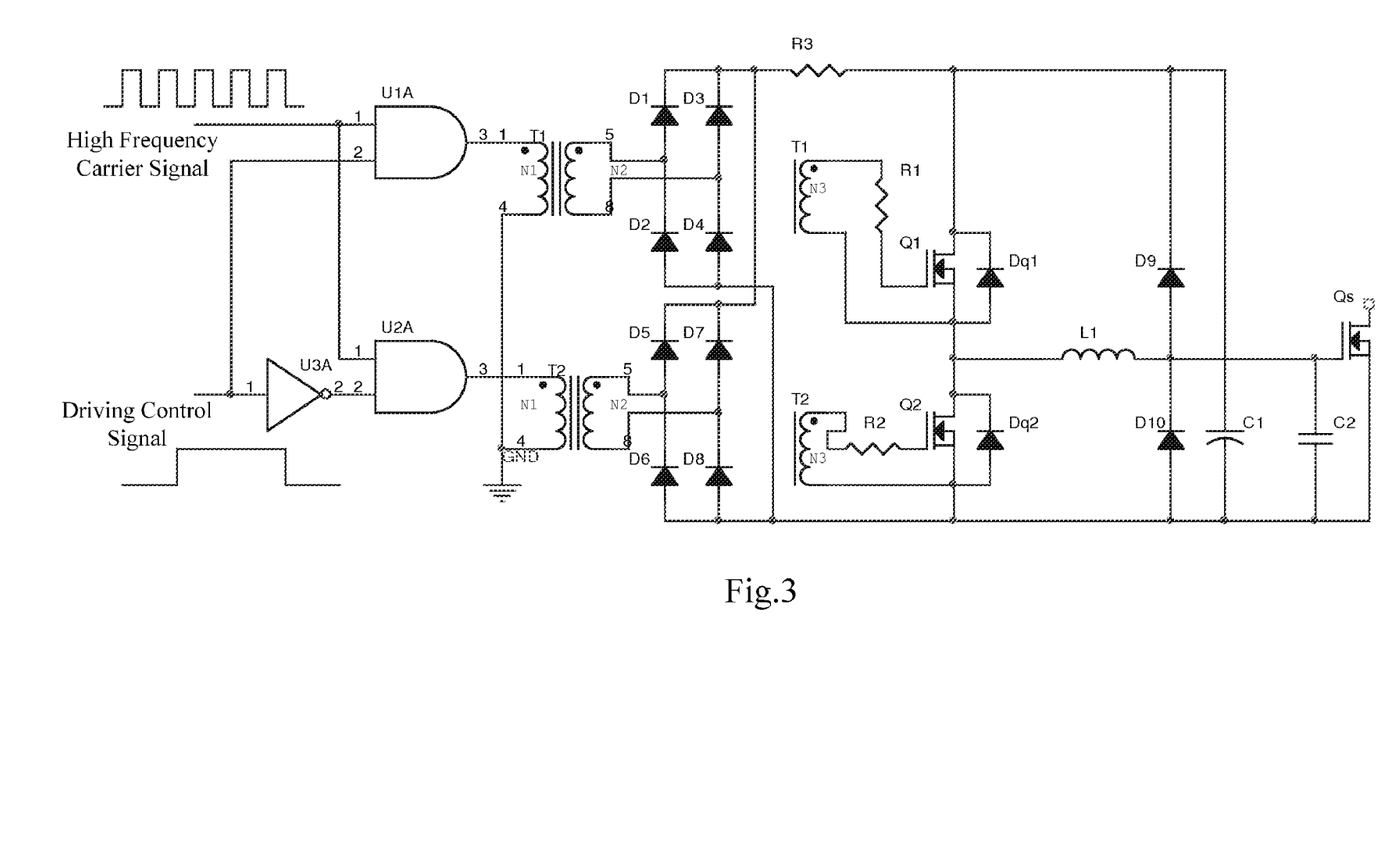
FIG. 3 is a circuit diagram of the transformer isolated driving circuit of the switch device of Embodiment 1.

Embodiment 1: a connection structure of this circuit is described with reference to FIG. 3.

A driving circuit of the switch device of this embodiment includes a transformer, an input terminal of a driving signal and a switch device. Said switch device employs MOSFET and the number of said transformers is two. The primary sides of the two transformers are connected to two driving modulators, respectively. One terminal of the primary side of a first transformer T1 is grounded while the other terminal is connected to the output terminal of a first driving modulator U1A. The input terminal of a high frequency carrier signal and the input terminal of the driving signal are connected to the input terminal of the first driving modulator U1A. One terminal of the primary side of a second transformer T2 is grounded while the other terminal is connected to the output terminal of a second driving modulator U2A. The input terminal of the driving signal is connected to the input terminal of an inverter U3A. The output terminal of the inverter U3A and the input terminal of the high frequency carrier signal are connected to the input terminal of the second driving modulator U2A.

The numbers of the secondary sides of said first transformer T1 and second transformer T2 are two, respectively. a rectifier diode D1, a rectifier diode D2, a rectifier diode D3 and a rectifier diode D4 constitute a full bridge rectifier circuit of the output terminal of the first secondary side of the first transformer. One terminal of the output terminal of the first secondary side of the first transformer T1 is connected to the positive terminal of the rectifier diode D1 and the negative terminal of the rectifier diode D2, respectively. The negative terminal of the rectifier diode D1 and the positive terminal of the rectifier diode D2 are connected in series with the rectifier diode D3 and the rectifier diode D4 in reverse direction. The other terminal of the output terminal of the first secondary side of the first transformer is connected between the rectifier diode D3 and the rectifier diode D4. A rectifier diode D5, a rectifier diode D6, a rectifier diode D7 and a rectifier diode D8 constitute a full bridge rectifier circuit of the output terminal of the first secondary side of the second transformer. One terminal of the output terminal of the first secondary side of the second transformer is connected to the positive terminal of the rectifier diode D5 and the negative terminal of the rectifier diode D6, respectively. The negative terminal of the rectifier diode D5 and the negative terminal of the rectifier diode D6 are connected in series with the rectifier diode D7 and the rectifier diode D8 in reverse direction. The other terminal of the output terminal of the first secondary side of the second transformer is connected between the rectifier diode D7 and the rectifier diode D8.

The negative terminals of the rectifier diode D3 and the rectifier diode D7 is connected to the positive terminal of the electrolytic capacitor C1, while the positive terminals of the rectifier diode D4 and the rectifier diode D8 is connected to the negative terminal of the electrolytic capacitor C1. The two output terminals of the second secondary side of the first transformer T1 are connected to the gate and source of a power charging driving switch transistor Q1, respectively. The positive terminal of the electrolytic capacitor C1 is connected to the drain of the power charging driving switch transistor Q1. The gate of switch device QS being connected in series with an inductor L1 is connected to the source of power charging driving switch transistor Q1. The negative terminal of the electrolytic capacitor C1 is connected to the source of switch device QS. The two output terminals of the second secondary side of the second transformer T2 are connected to the gate and source of the discharge voltage driving switch transistor Q2, respectively. The source of switch device QS is connected to the source of discharge voltage driving switch transistor Q2. The gate of switch device QS being connected in series with an inductor L1 is connected to the drain of the discharge voltage driving switch transistor Q2. The gate of the switch device QS and the drain of the power charging driving switch transistor Q1 are connected in series with a diode D9 in forward direction, the gate of the switch device QS and the source of discharge voltage driving switch transistor Q2 are connected in series with a diode D10 in reverse direction.

In combination with FIG. 4 to FIG. 9, the working principle of this circuit is described below.

The high and low levels of the driving signal are transferred via two transformers T1 and T2, respectively. When the driving signal is at a high level, an AND operation are performed on the driving signal and a high frequency carrier at 50% duty cycle, then the U1A outputs the high frequency carrier signal and the primary and secondary sides of transformer T1 obtain a high frequency signal at 50% duty cycle, meanwhile the driving signal, after being inverted, obtain a low level to lock out the output of U2A so that there is no signal on the transformer T2. The high frequency signal of the secondary side of T1, after being rectified by the diodes D1 through D4, charges the electrolytic capacitor C1. Since the entire circuit from the transformer T1 to the diodes D1 through D4, a current limiting resistor R3 and to the electrolytic capacitor C1 has a relatively low resistance (the resistor R3 functions to limit the current at moment of powering on and may be eliminated when the circuit resistance can limit impulse current). The voltage may rise rapidly to the peak voltage of the secondary side of transformer T1 so that voltage on the electrolytic capacitor C1 serves as an auxiliary power supply of the driving. During the entire high level period of the driving signal, the high frequency carrier voltage at 50% duty cycle, after being rectified by the diodes D1 through D4, charges the electrolytic capacitor C1 all the time to maintain the energy so as to ensure the stability of the auxiliary power supply of the driving.

Another winding N3 of the transformer T1 controls the turn-on of Q1 via the resistor R1 at a rising edge of the pulse. Voltage on the electrolytic capacitor C1 charges the equivalent capacitor C2 of a main switch transistor Qs via Q1 and L1. The series resonance caused by L1 and C2 raises rapidly the voltage on the equivalent capacitor C2 of the switch transistor Qs to the voltage on Vc1. The circuit is as shown in FIG. 4.

Figure 5:
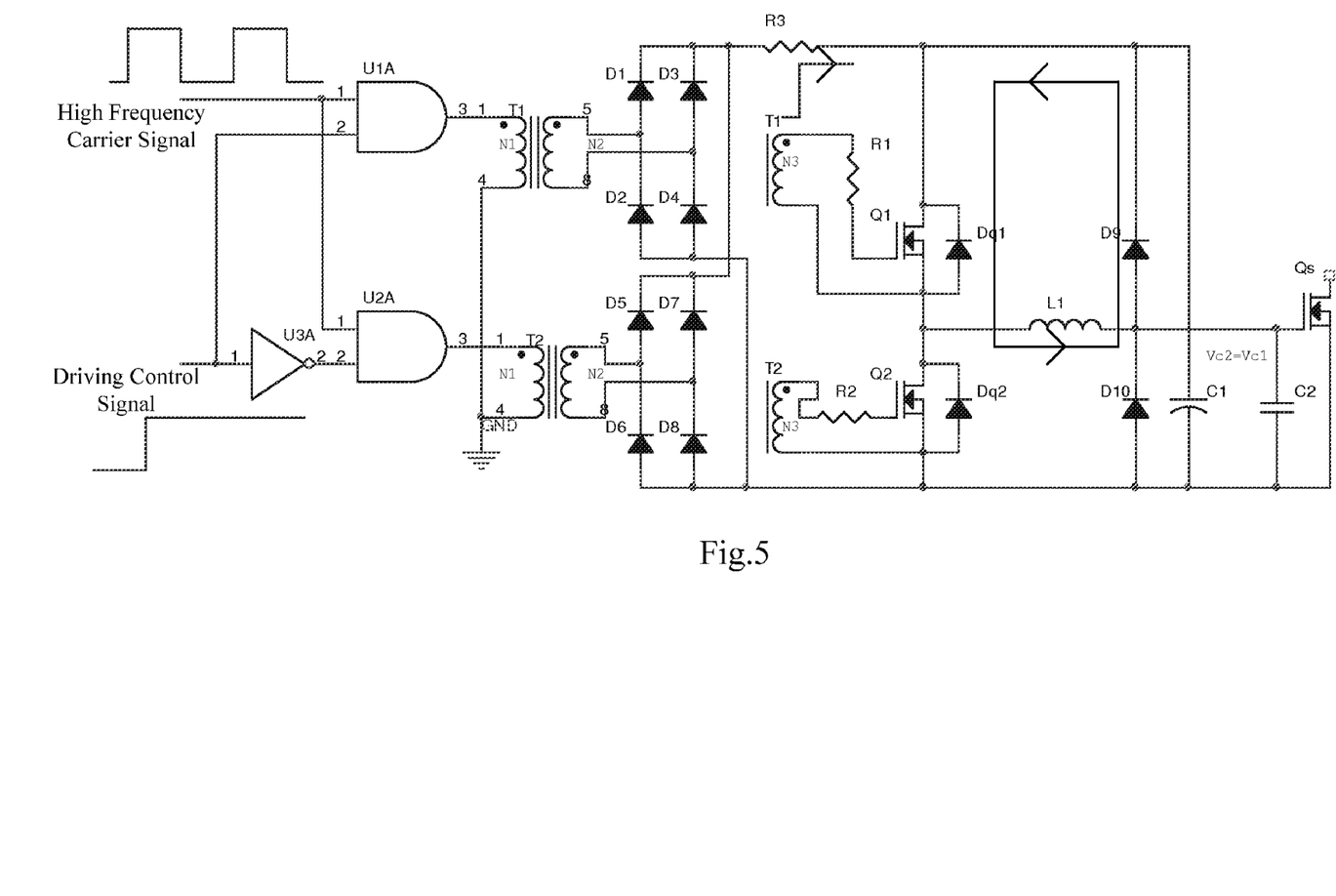
FIG. 5 is the equivalent circuit diagram of Embodiment 1 when Q1 is turned on, Vc2=Vc1 and the current in the inductor L1 is in maintaining stage.

When the voltage of Vc2 rises gradually to satisfy Vc2=Vc1, D9 is turned on so that the inductor current flows through L1, the diode D9 and the switch transistor Q1 to form a maintaining circuit as shown in FIG. 5.

When the voltage of the secondary side of T1 is reversed, the switch transistor Q1 is turned off so that current in the inductor L1 flows through the reversed diode Dq2 connected in parallel with the switch transistor, the inductor L1 and the diode D9 to feed the energy back to the electrolytic capacitor C1. The specific circuit diagram is shown in FIG. 6.

Figure 4:
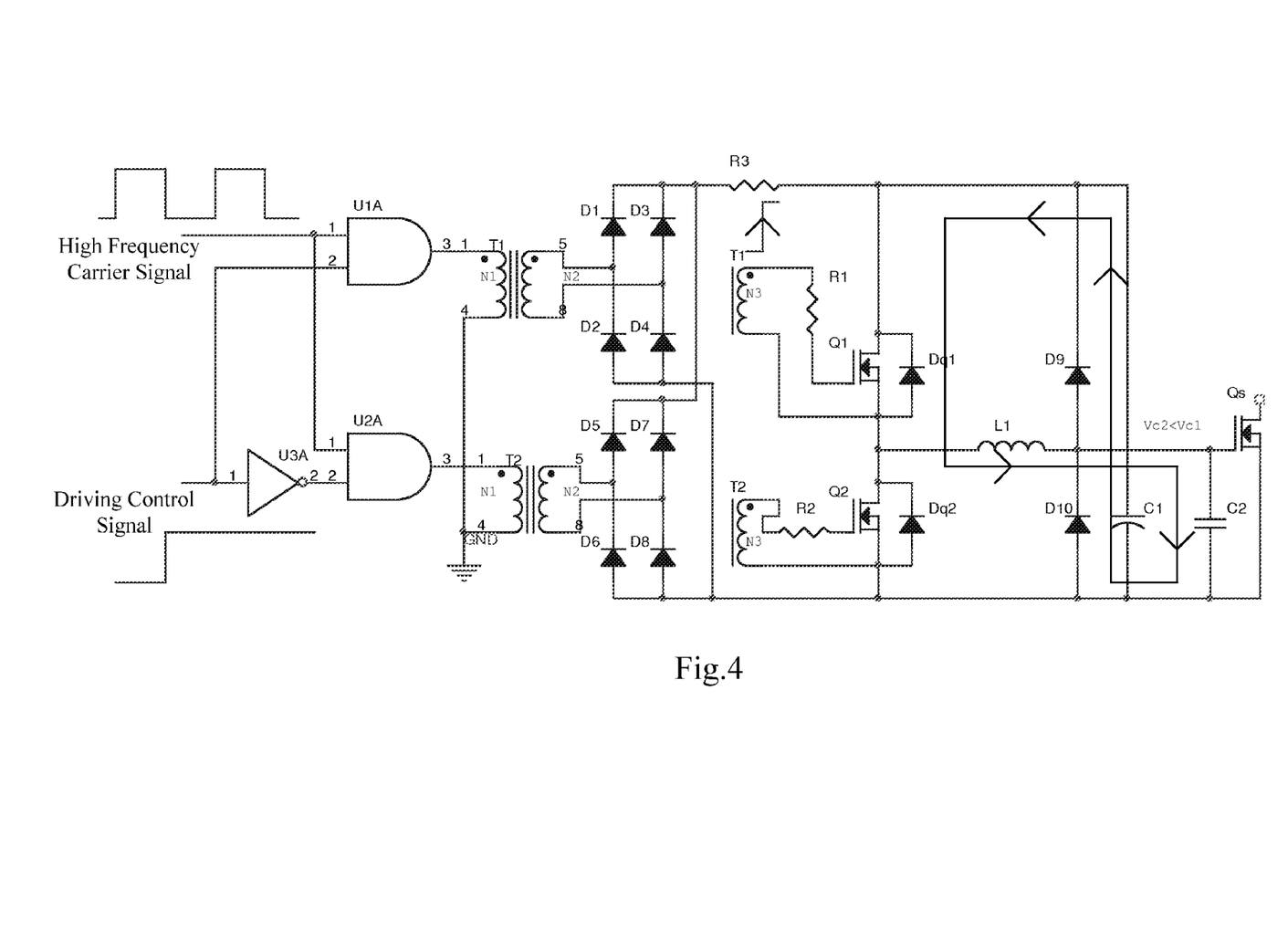
FIG. 4 is a equivalent circuit diagram of Embodiment 1 when Qs is turned on and the gate voltage rises.
Figure 6:
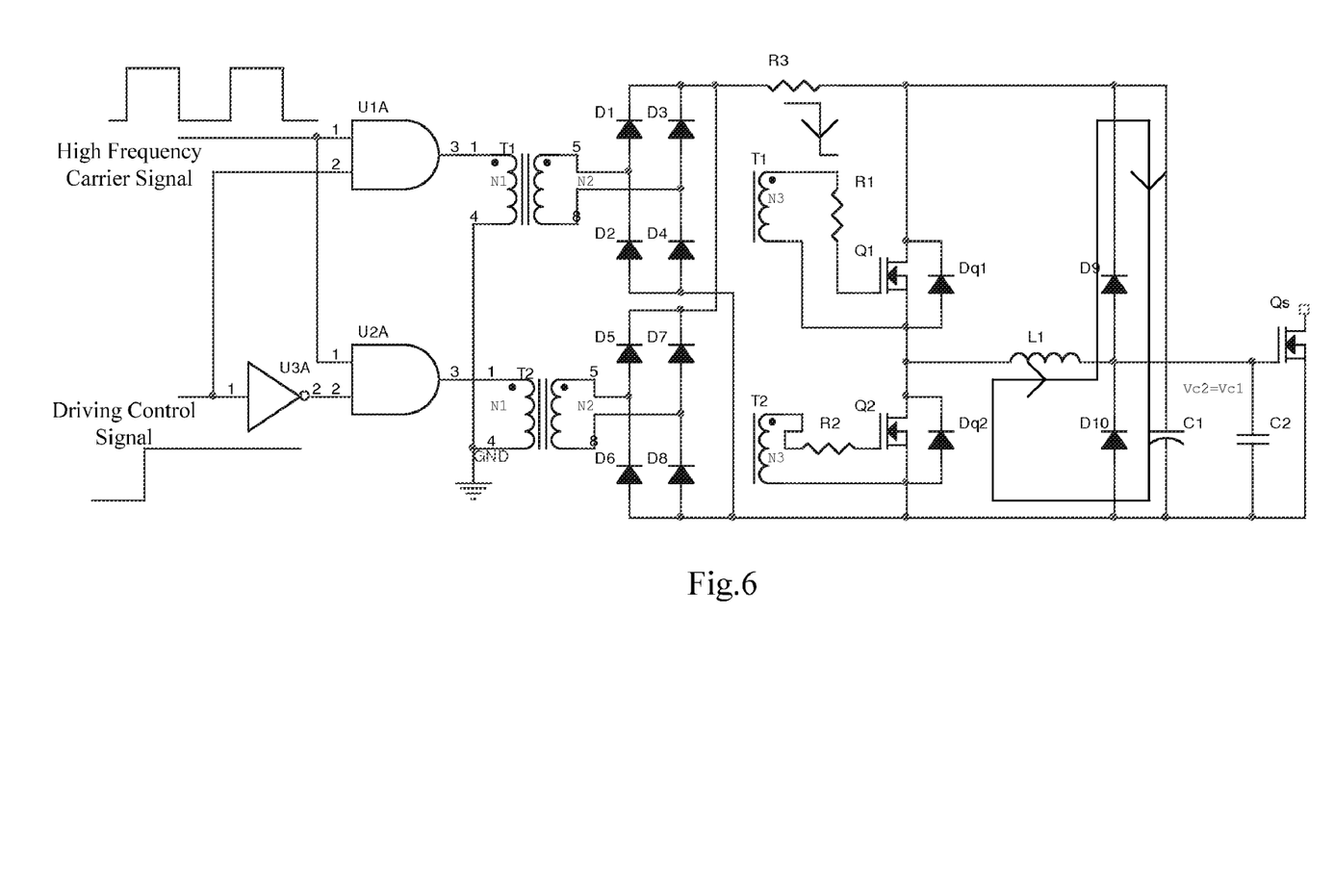
FIG. 6 is the equivalent circuit diagram of Embodiment 1 when Q1 is turned off and the energy in the inductor L1 is fed back to the capacitor C1.

As can be seen from the turn-on process of Qs as shown in FIGS. 4, 5 and 6, the on and off of the driving switch transistor Q1 provide the gate of the main transistor Qs with a necessary voltage for being turned on and the voltage is clamped by the driving auxiliary power voltage Vc1 (i.e., voltage on two terminals of the electrolytic capacitor). In the entire driving controlled high level device, Q1 keeps being turned on and off continuously so as to maintain the stability of the gate voltage of the main switch transistor Qs. In addition, there is no energy loss in the inductor L1.

When the driving control signal is at a low level, this signal is reversed by a inverter U3A to obtain a high level, and after an AND operation is performed with a high frequency carrier at 50% duty cycle, a high frequency carrier signal is obtained at the output terminal of U2A, then the primary and secondary sides of the transformer T2 obtain a high frequency signal at 50% duty cycle, meanwhile the driving control signal at a low level locks out the output of U1A so that there is no signal on transformer T1. The voltage on the winding N2 of the transformer T2 is rectified via the diodes D5 through D8 to continue charging the electrolytic capacitor C1, thereby maintaining the stability of auxiliary power voltage of the driving.

Another winding N3 of T2 controls to turn on Q2 via the resistor R2, and voltage on the gate equivalent capacitor C2 of main switch transistor Qs passes through Q2 and L1 to form a discharge circuit and the energy on the capacitor C2 is converted into magnetic energy in L1, so that current in inductor L1 rises gradually whereas voltage on the capacitor C2 drops gradually. The circuit diagram is shown in FIG. 7.

Figure 8:
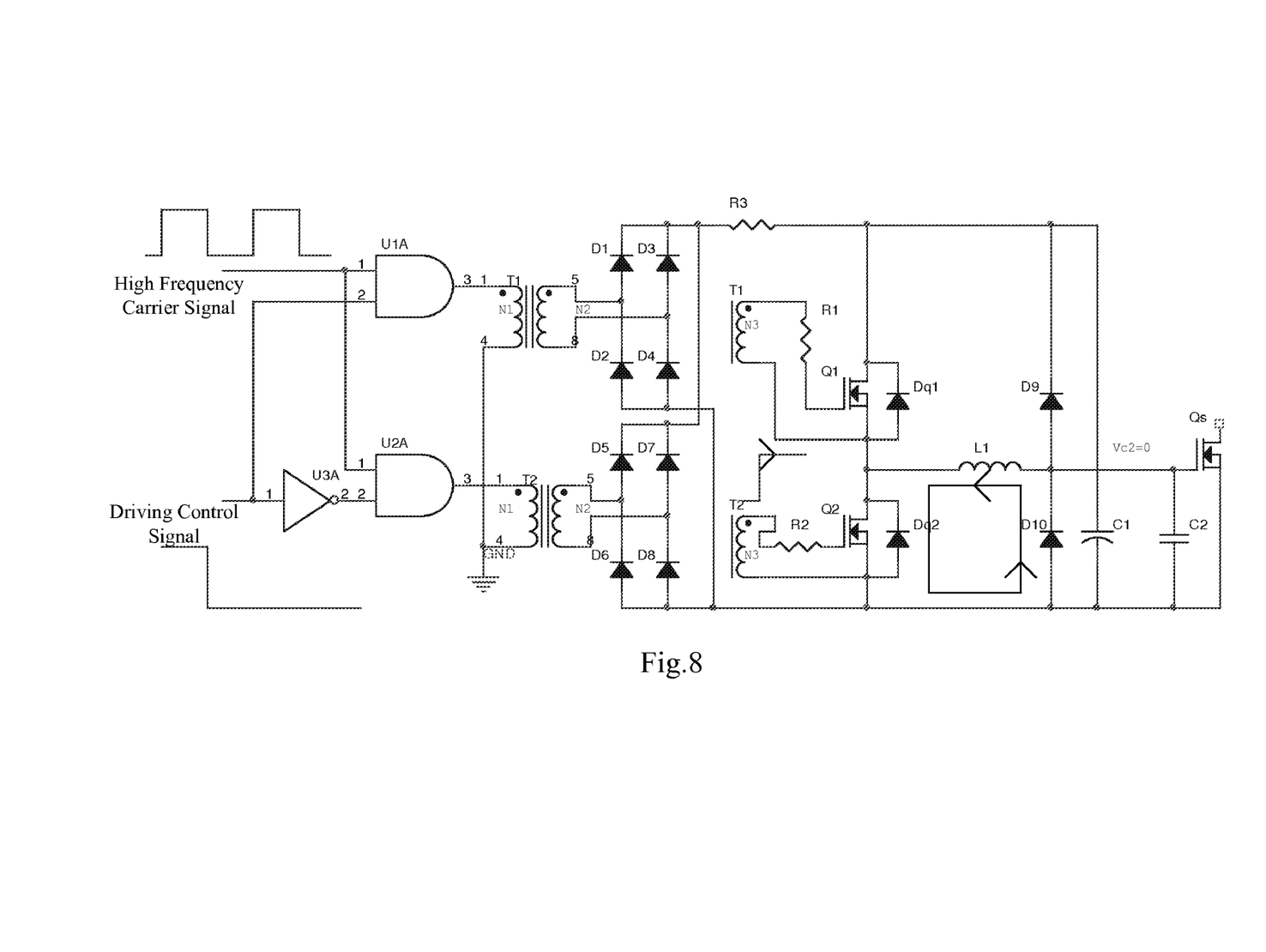
FIG. 8 is the equivalent circuit diagram of Embodiment 1 when Q2 is turned on, Vc2=0 and the current in the inductor L1 is in maintaining stage.

When voltage of Vc2 drops gradually to zero, D10 is turned on so that the inductor current flows through L1, the diode D10 and the switch transistor Q2 to form a maintaining circuit as shown in FIG. 8.

When the voltage of the secondary side of T1 is reversed, the switch transistor Q2 is turned off so that current in the inductor L1 flows through the reversed diode Dq1 connected in parallel with the switch transistor Q1, the inductor L1 and the diode D10 to feed the energy back to the electrolytic capacitor C1. The specific circuit diagram is shown in FIG. 9.

Figure 7:
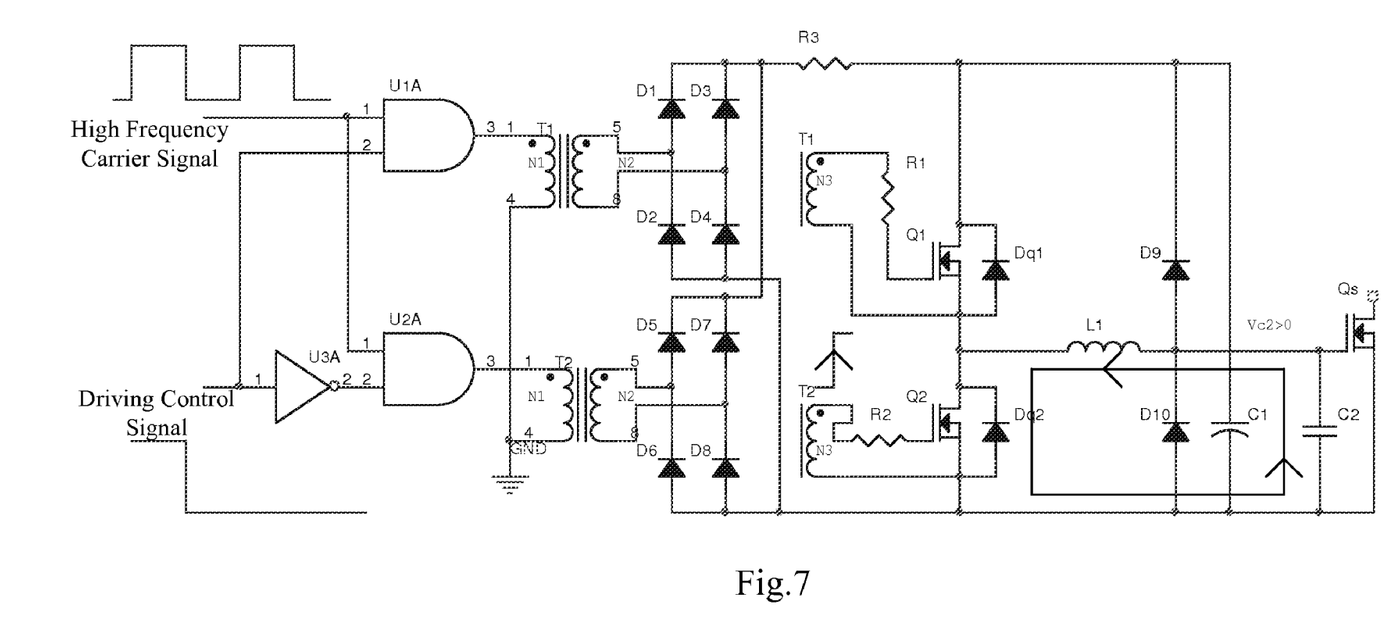
FIG. 7 is the equivalent circuit diagram of Embodiment 1 when Q2 is turned on and the gate voltage of Qs drops.
Figure 9:
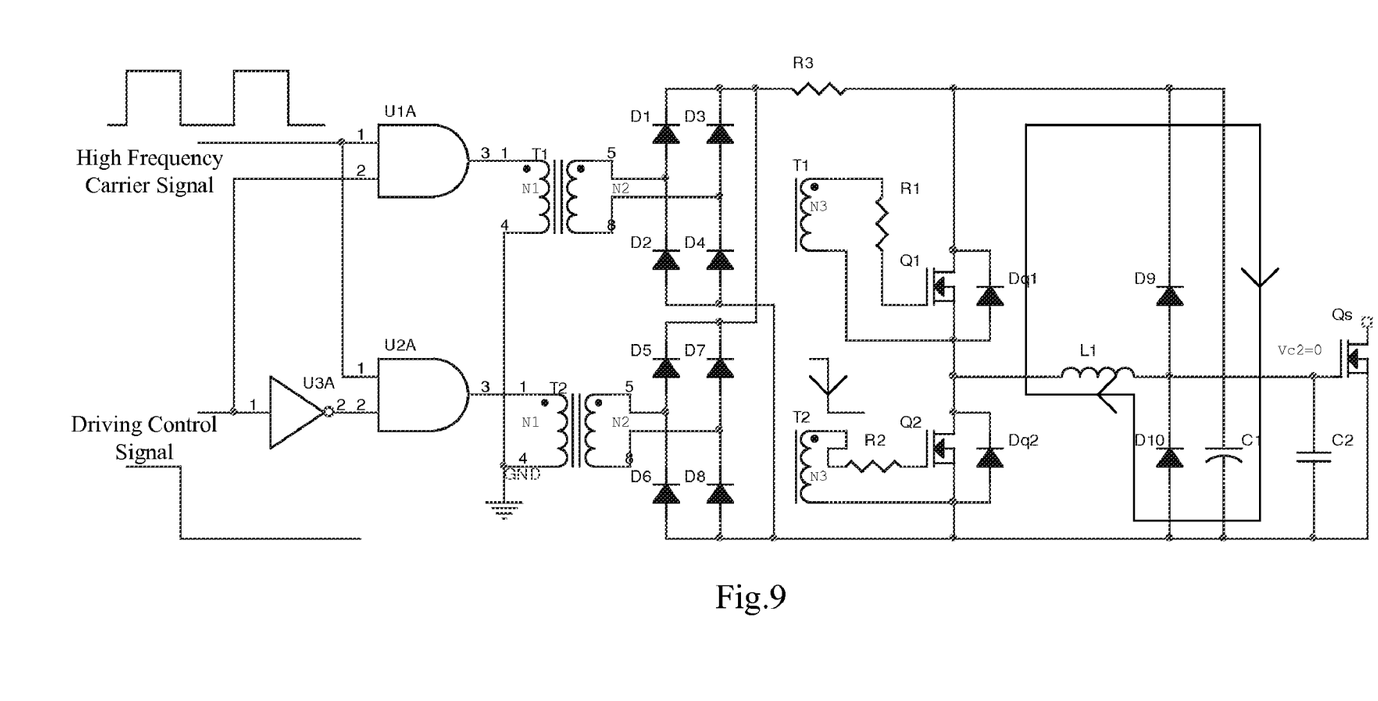
FIG. 9 is the equivalent circuit diagram of Embodiment 1 when Q2 is turned off and the energy in the inductor L1 is fed back to the capacitor C1.

As can be seen from the turn-off process of Qs as shown in FIGS. 7, 8 and 9, the turn-on of the driving transistor Q2 provides the gate of the main transistor Qs with a necessary voltage discharge circuit for being turned off and the gate voltage of Qs is clamped at 0V by D10; the energy in the capacitor C2 is transferred to the inductor and then is fed back to the auxiliary power supply C1.

As can be seen from the on and off processes of driving control signal, the high and low levels of the driving control signal pass through the transformer T1 and the transformer T2 respectively to achieve the transfer of the auxiliary power supply and the signal. The energy on the gate of the main switch transistor Qs passes through the inductor L1, the driving switch transistors Q1 and Q2, the diodes D9 and D10, the auxiliary power supply C1 and the gate capacitor C2 to form resonance circuits respectively, thereby performing energy exchange and achieving driving without loss.

The driving circuit of the switch device in this embodiment transfers a driving signal and a driving power supply by means of two transformers wherein a transformer T1 transfers a high level signal and the auxiliary power supply whereas a transformer T2 transfers a low level signal and the auxiliary power supply. Since the signals and the auxiliary power supply adopt high frequency modulation mode, the size and cost of the transformers are reduced.

In the driving circuit, by means of the LC lossless circuit, the driving circuit keeps being supplied with new energy during the turn-on period of the main switch transistor QS, and the energy of the inductor passes through the diode circuit to be clamped by the auxiliary power supply and to be fed back to the auxiliary power supply. When the main switch device is turned off, the driving circuit passes the energy of the gate through LC circuit to feed the energy back to driving auxiliary power supply, and maintains the low level of the gate via the driving circuit.

Figure 10:
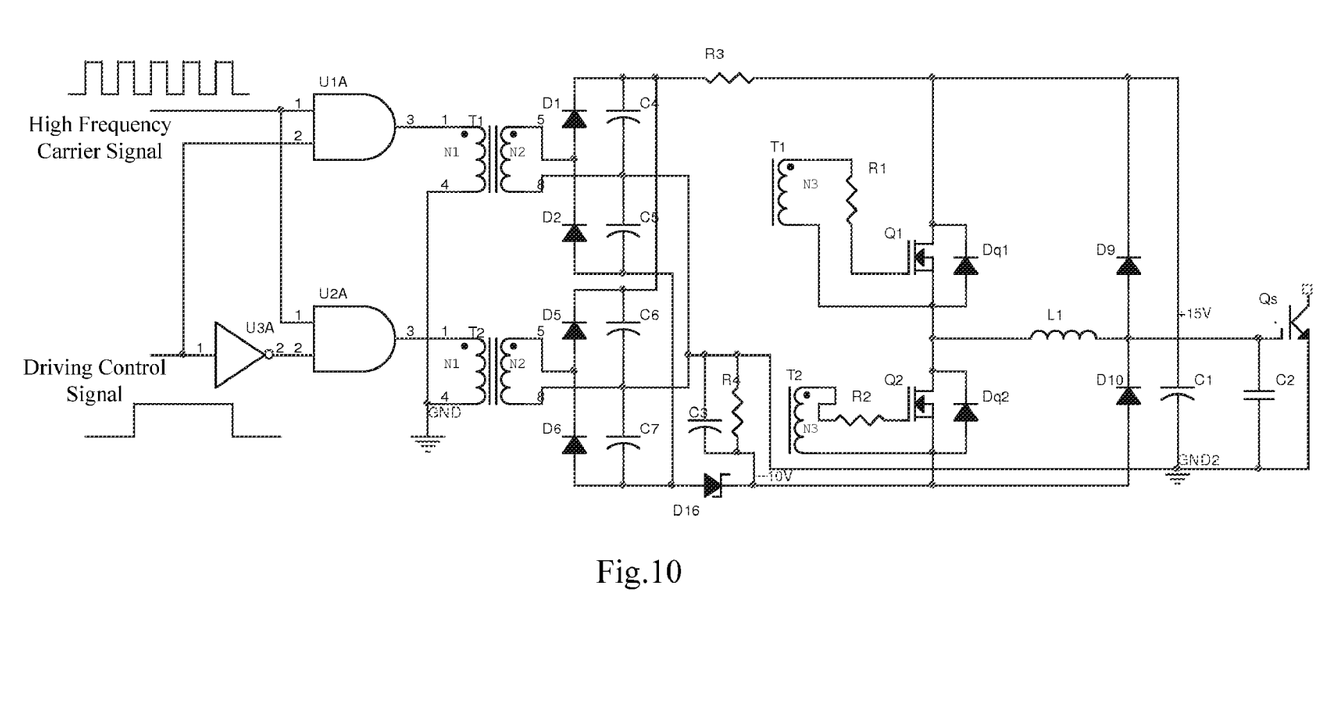
FIG. 10 is the circuit diagram of the transformer isolated driving circuit of the switch device of Embodiment 2.

Embodiment 2: a connection structure of this circuit is described with reference to FIG. 10.

A driving circuit of the switch device of this embodiment includes transformers, an input terminal of a driving signal and a switch device. Said switch device employs IGBT. The number of said transformers is two. The primary sides of the two transformers are connected to two driving modulators, respectively. One terminal of the primary side of a first transformer T1 is grounded while the other terminal is connected to the output terminal of a first driving modulator U1A. The input terminal of a high frequency carrier signal and the input terminal of a driving signal are connected to the input terminal of the first driving modulator U1A. One terminal of the primary side of a second transformer T2 is grounded while the other terminal is connected to the output terminal of a second driving modulator U2A. The input terminal of the driving signal is connected to the input terminal of a inverter U3A, the output terminal of the inverter U3A and the input terminal of the high frequency carrier signal are connected to the input terminal of the second driving modulator U2A.

The numbers of the secondary sides of said first transformer T1 and second transformer T2 are two, respectively. A rectifier diode D1, a rectifier diode D2, an electrolytic capacitor C4 and an electrolytic capacitor C5 constitute a half bridge rectifier circuit of the output terminal of the first secondary side of the first transformer. One terminal of the output terminal of the first secondary side of the first transformer T1 is connected to the positive terminal of the rectifier diode D1 and the negative terminal of the rectifier diode D2, respectively. The negative terminal of the rectifier diode D1 and the positive terminal of the rectifier diode D2 are connected in series with the electrolytic capacitor C4 and the electrolytic capacitor C5 in forward direction. The other terminal of the output terminal of the first secondary side of the first transformer is connected between the electrolytic capacitor C4 and the electrolytic capacitor C5. A rectifier diode D5, a rectifier diode D6, an electrolytic capacitor C6 and an electrolytic capacitor C7 constitute a half bridge rectifier circuit of the output terminal of the first secondary side of the second transformer. One terminal of the output terminal of the first secondary side of the second transformer is connected to the positive terminal of the rectifier diode D5 and the negative terminal of the rectifier diode D6, respectively. The negative terminal of the rectifier diode D5 and the negative terminal of the rectifier diode D6 are connected in series with the electrolytic capacitor C6 and the electrolytic capacitor C7 in forward direction. The other terminal of the output terminal of the first secondary side of the second transformer is connected between the electrolytic capacitor C6 and the electrolytic capacitor C7.

The positive terminal of the electrolytic capacitor C4 and the electrolytic capacitor C5 is connected to the positive terminal of the electrolytic capacitor C1, while the negative terminal of the electrolytic capacitor C1 is connected between the electrolytic capacitor C4 and the electrolytic capacitor C5 and between the electrolytic capacitor C6 and the electrolytic capacitor C7. The two output terminals of the second secondary side of the first transformer T1 are connected to the gate and source of a power charging driving switch transistor Q1, respectively. The positive terminal of the electrolytic capacitor C1 is connected to the drain of the power charging driving switch transistor Q1. The gate of switch device QS being connected in series with an inductor L1 is connected to the source of the power charging driving switch transistor Q1. The negative terminal of the electrolytic capacitor C1 is connected to the source of switch device QS. The two output terminals of the second secondary side of the second transformer T2 are connected to the gate and source of the discharge voltage driving switch transistor Q2, respectively. The gate of switch device QS being connected in series with an inductor L1 is connected to the drain of the discharge voltage driving switch transistor Q2. The gate of the switch device QS and the drain of the power charging driving switch transistor Q1 are connected in series with diode D9 in forward direction. The gate of switch device QS is connected to the negative terminal of diode D10. A Zener diode D16 is connected in series in the forward direction between the negative terminal of the electrolytic capacitor C5 and C7 and the positive terminal of the diode D10. The electrolytic capacitor C3 and the resistor R4 are connected in parallel. The positive terminal of the electrolytic capacitor C3 is connected to the negative terminal of the electrolytic capacitor C1. The negative terminal of the electrolytic capacitor C3 is connected to the negative terminal of the Zener diode D16. Accordingly, a positive driving voltage is obtained at two terminals of C1 and a negative driving voltage is obtained at two terminals of C3. The working principle thereof is similar to that of FIG. 3, i.e., when the control signal is at a high level, the high frequency modulation signal makes the high frequency of Q1 be turned on and off to produce, at the two terminals of C2, a positive driving voltage which is equal to that of C1 and turn on the main switch transistor Qs; and when the control signal is at a low level, the high frequency modulation signal makes the high frequency of Q2 be turned on and off to produce, at the two terminals of C2, a negative driving voltage which is equal to that of C3 and turn off the main switch transistor, thereby maintaining negative driving voltage and improving the anti-interference ability.

Figure 11:
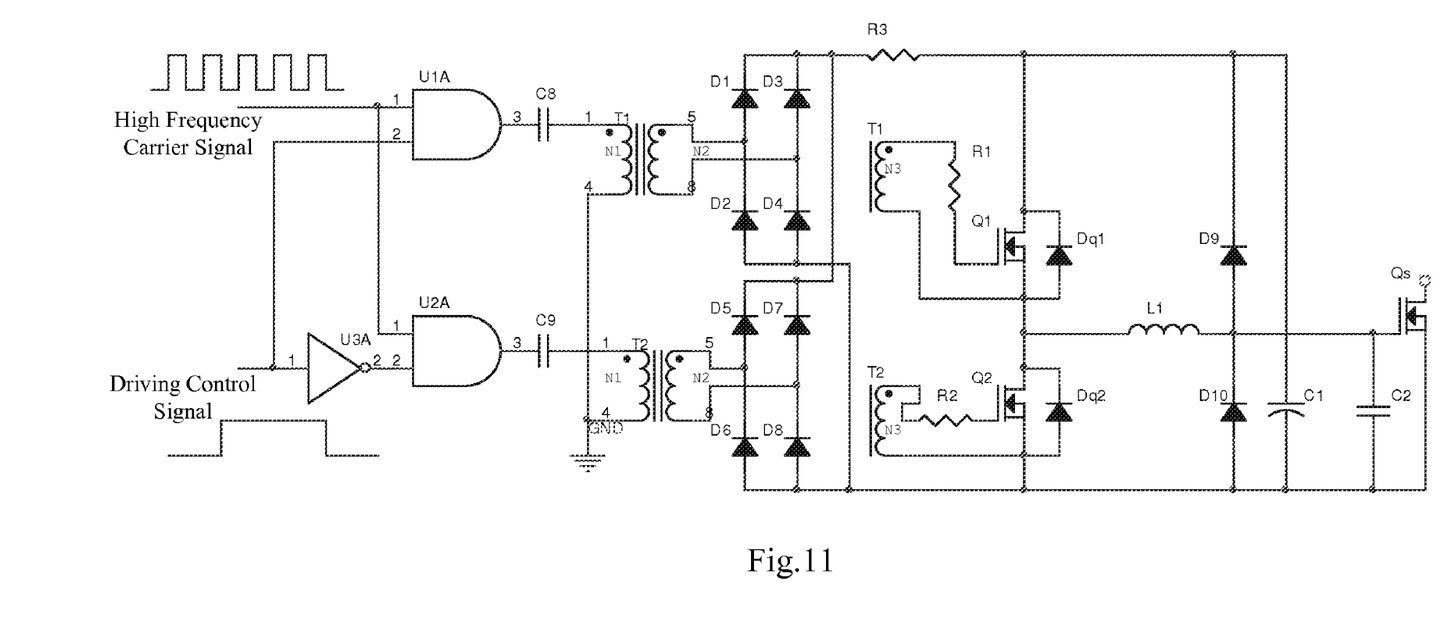
FIG. 11 is the circuit diagram of the transformer isolated driving circuit of the switch device of Embodiment 3.

Embodiment 3: a connection structure of this circuit is described with reference to FIG. 11.

This circuit has a similar structure as Embodiment 1 except for the difference that two capacitors connected in series are added, which are: a capacitor C8 connected in series between the output terminal of the first driving modulator U1A and the primary side of the first transformer T1, and a capacitor C9 connected in series between the output terminal of the second driving modulator U2A and the primary side of the second transformer T2. The purpose of connecting the capacitors C8 and C9 in series is to prevent the driving transformer from becoming saturated due to DC bias. The rest portions have similar working principles as that in FIG. 3.

What is claimed is:

1. A driving circuit of switch devices, comprising a transformer, an input terminal of a driving signal and a switch device, with the input terminal of the driving signal connecting to a primary side of the transformer and the switch device connecting to a secondary side of the transformer, wherein:
the number of said transformers is two; the primary sides of the two transformers are connected to two driving modulators, respectively; one terminal of the primary side of a first transformer T1 is grounded while the other terminal is connected to an output terminal of a first driving modulator U1A; an input terminal of a high frequency carrier signal and the input terminal of the driving signal are connected to an input terminal of the first driving modulator U1A; one terminal of the primary side of a second transformer T2 is grounded while the other terminal is connected to an output terminal of a second driving modulator U2A; the input terminal of the driving signal is connected to an input terminal of an inverter U3A; an output terminal of the inverter U3A and the input terminal of the high frequency carrier signal are connected to an input terminal of the second driving modulator U2A; a secondary side of the first transformer T1 is connected to a power supply circuit which may provide necessary voltage for turning on the switch device during a high level period of the driving signal; and a secondary side of the second transformer T2 is connected to a voltage discharging circuit which may discharge the turn-on voltage of the switch device into a low level during a low level period of the driving signal,
wherein the number of the secondary side of said first transformer T1 is two; said power supply circuit comprises an electrolytic capacitor C1 and a power charging driving switch transistor Q1 having its gate and source connected respectively to two output terminals of the second secondary side of the first transformer T1;
the first secondary side of the first transformer T1, after being rectified, is connected in parallel with the electrolytic capacitor C1;
a negative terminal of the electrolytic capacitor C1 is connected to a source of a switch device QS;
a positive terminal of the electrolytic capacitor C1 is connected to a drain of the power charging driving switch transistor Q1;
a gate of the switch device QS is connected to a source of the power charging driving switch transistor Q1.

2. The driving circuit of switch devices according to claim 1, wherein the number of the primary side of said second transformer T2 is one; said voltage discharging circuit comprises an energy dissipating element and a discharge voltage driving switch transistor Q2 having its gate and source connected respectively to two output terminals of the secondary side of the second transformer; a gate of a switch device QS being connected in series with the energy dissipating element which is connected to a drain of the discharge voltage driving switch transistor Q2, and a source of the switch device QS is connected to a source of the discharge voltage driving switch transistor.

3. The driving circuit of switch devices according to claim 1, wherein the number of the primary side of said second transformer T2 is two; said voltage discharging circuit comprises an energy dissipating device and a discharge voltage driving switch transistor Q2 having its gate and source connected respectively to two output terminals of the second secondary side of the second transformer; the gate of the switch device QS being connected in series with the energy dissipating device is connected to a drain of the discharge voltage driving switch transistor Q2; a source of the discharge voltage driving switch transistor Q2 is connected to the output terminals of the first secondary sides being rectified of the first transformer T1 and the second transformer T2 which output a low voltage; the first secondary side of the second transformer T2, after being rectified, is connected in parallel with said electrolytic capacitor C1.

4. The driving circuit of switch devices according to claim 3, wherein said energy dissipating element is an inductor L1; the gate of the switch device QS and the source of the power charging driving switch transistor Q1 are connected in series via said inductor L1; the gate of the switch device QS and the drain of the power charging driving switch transistor Q1 are connected in series via a diode D9 in forward direction; the gate of the switch device QS and the output terminals of the first secondary sides being rectified of the first transformer T1 and the second transformer T2 which output a low voltage are connected in series via a diode D10 in reverse direction.

5. The driving circuit of switch devices according to claim 3, wherein the source of said discharge voltage driving switch transistor Q2 and the negative terminal of the electrolytic capacitor C1 are connected to the same output terminal of the first secondary sides being rectified of the first transformer T1 and the second transformer T2 which output a low voltage.

6. The driving circuit of switch devices according to claim 4, wherein the positive terminal of the diode D10, the source of the discharge voltage driving switch transistor Q2 and the negative terminal of the electrolytic capacitor C1 are connected to the same output terminal of the first secondary side being rectified of the first transformer T1 and the second transformer T2 which output a low voltage.

7. The driving circuit of switch devices according to claim 4, wherein said switch device is an IGBT, and a diode D1, a diode D2, an electrolytic capacitor C4, an electrolytic capacitor C5 constitute a half bridge rectifier circuit of the output terminal of the first secondary side of the first transformer; one terminal of the output terminal of the first secondary side of the first transformer T1 is connected respectively to the positive terminal of the diode D1 and the negative terminal of the diode D2; the negative terminal of the diode D1 and the positive terminal of the diode D2 are connected in series with the electrolytic capacitor C4 and the electrolytic capacitor C5 in forward direction; the other terminal of the output terminal of the first secondary side of the first transformer is connected between the electrolytic capacitor C4 and the electrolytic capacitor C5; whereas a diode D5, a diode D6, an electrolytic capacitor C6, an electrolytic capacitor C7 constitute a half bridge rectifier circuit of the output terminal of the first secondary side of the second transformer; one terminal of the output terminal of the first secondary side of the second transformer is connected respectively to the positive terminal of the diode D5 and the negative terminal of the diode D6; the negative terminal of the diode D5 and the negative terminal of the diode D6 are connected in series with the electrolytic capacitor C6 and the electrolytic capacitor C7 in forward direction; the other terminal of the output terminal of the first secondary side of the second transformer is connected between the electrolytic capacitor C6 and the electrolytic capacitor C7; the negative terminal of the electrolytic capacitor C1 is connected between the electrolytic capacitor C4 and the electrolytic capacitor C5 and between the electrolytic capacitor C6 and the electrolytic capacitor C7; a Zener diode D16 is connected in series in the forward direction between the negative terminal of the electrolytic capacitor C5 and C7 and the diode D10; an electrolytic capacitor C3 and a resistor R4 are connected in parallel; the positive terminal of the C3 is connected to the negative terminal of the electrolytic capacitor C1; the negative terminal of the C3 is connected to the negative terminal of the Zener diode D16.

8. The driving circuit of switch devices according to claim 4, wherein said switch device is an MOS, and a capacitor C8 is connected in series between the output terminal of the first driving modulator U1A and the primary side of the first transformer T1, whereas a capacitor C9 is connected in series between the output terminal of the second driving modulator U2A and the primary side of the second transformer T2.

* * * * *